United States Patent [19]

Okai et al.

[11] Patent Number: 5,064,468
[45] Date of Patent: * Nov. 12, 1991

[54] CORROSION PREVENTIVE COATING COMPOSITION

[75] Inventors: Toshihiro Okai, Katano; Yoshiaki Okumura, Joyo; Mitsuyuki Oda, Kyoto; Takashi Yamamoto, Souraku; Hideo Fukuda, Itami; Teruaki Kuwajima, Higashiosaka, all of Japan

[73] Assignee: Nippon Paint Co., Ltd., Osaka, Japan

[*] Notice: The portion of the term of this patent subsequent to Aug. 6, 2008 has been disclaimed.

[21] Appl. No.: 334,546

[22] Filed: Apr. 7, 1989

Related U.S. Application Data

[63] Continuation of Ser. No. 90,966, Aug. 31, 1987, abandoned.

[51] Int. Cl.$^5$ .................. C04B 14/30; C04B 14/34; C04B 14/36; C09D 1/00
[52] U.S. Cl. .................... 106/14.12; 106/2; 106/14.05; 106/14.11; 106/14.21; 106/286.1; 106/286.8; 106/287.29; 106/400; 106/401; 106/479
[58] Field of Search .............. 106/479, 14.12, 14.05, 106/14.21, 74; 148/261, 267; 528/247, 232; 523/458

[56] References Cited

U.S. PATENT DOCUMENTS

| | | | |
|---|---|---|---|
| 1,254,263 | 1/1918 | Oeschger | 148/261 |
| 1,947,122 | 4/1932 | Burdick et al. | 148/6 |
| 3,365,313 | 1/1968 | Roberts et al. | 106/14.31 |
| 3,443,977 | 5/1969 | Bennetch | 106/302 |
| 3,951,667 | 4/1976 | Kogure et al. | 106/14.13 |
| 3,960,676 | 6/1976 | Miyosawa et al. | 204/181.3 |
| 3,963,568 | 6/1976 | Nikaido et al. | 204/181 |
| 4,017,315 | 4/1977 | Vukasovich et al. | 106/14.21 |
| 4,230,500 | 10/1980 | Balducci | 106/288 B |
| 4,233,088 | 11/1980 | Kronstein | 148/251 |
| 4,505,748 | 3/1985 | Baxter | 106/14.39 |
| 4,885,032 | 12/1989 | Okai et al. | 106/404 |

*Primary Examiner*—William R. Dixon, Jr.
*Assistant Examiner*—Scott L. Hertzog
*Attorney, Agent, or Firm*—Wenderoth, Lind & Ponack

[57] ABSTRACT

Disclosed is a corrosion preventive coating composition comprising;
(1) a corrosion preventive pigment which has a pH value of from 5 to 9, consisting essentially of
  (a) a specific phosphorus compound which generates phosphate ions in the presence of water, and
  (b) a specific vanadium compound which generates vanadate ions in the presence of water and oxygen, and
(2) a film forming resin selected from the group consisting of maleic acid modified oils, epoxy resins, modified epoxy resins, alkyd resins, acryl resins, melamine resins, urea resins, blocked isocyanate resins, maleic acid modified polybutadiene resins, polyvinyl butylal, polyvinylalcohol, silicate esters, silicone resins, silicates and chlorinated rubber; said pigment being present in an amount of 0.1 to 50 parts by weight based on 100 parts by weight of a solid content of said coating composition.

5 Claims, No Drawings

CORROSION PREVENTIVE COATING COMPOSITION

This is a continuation in part of now abandoned application, Ser. No. 07/090,966, filed Aug. 31, 1987.

FIELD OF THE INVENTION

The present invention relates to a corrosion preventive coating composition for protecting a metal substrate from corrosive conditions.

BACKGROUND OF THE INVENTION

A paint primarily forms a coating film on a substrate for preventing corrosion. A paint which has enhanced corrosion preventive properties is specifically called "corrosion preventive paint" and is used for many usages.

Corrosion preventive properties of the corrosion preventive paint are generally attained by a material which generates a chromate ion. The chromate ion has two functions. One is an oxidizer function whereby the chromate ion ($CrO_4^{2-}$) is reacted with a metal atom, such as Fe to form stable gamma-$Fe_2O_3$, and the other is a deposition function whereby the chromate ion is reduced to form a chromium oxide, for example $Cr_2O_3$ which is deposited on a metal surface. According to these two functions, a physical barrier film is formed on the metal surface to develop excellent corrosion preventive properties.

However, the chromium (VI) having high corrosion preventive properties is toxic to human body and therefore very limited in use by several regulations in Japan and many other countries. Accordingly, many efforts have been payed to develop a corrosion preventive agent which is not or little toxic to human body. For example, phosphate materials, especially zinc phosphate, silicophosphate, aluminum condensed phosphate and the like are now studied and some of them are commercially available. The phosphate materials, however, have only the deposition function whereby the phosphate materials are reacted with metal to produce a matSSial protecting the metal substrate, but does not have the oxidizer function. The phosphate materials have low corrosion preventive properties in comparison with the above mentioned chromate ions.

SUMMARY OF THE INVENTION

It has been found that the oxidizer function which is lack in the phosphate materials is compensated for vanadate ions.

Accordingly, the present invention is to provide a corrosion preventive coating composition comprising;
(1) a corrosion preventive pigment which has a pH value of from 5 to 9, consisting essentially of
  (a) a phosphorus compound which generates phosphate ions in the presence of water, selected from the group consisting of phosphorous pentoxide, ortho-phosphoric acid, a condensed phosphoric acid, an alkaline metal, alkaline earth metal or transition metal phosphate, or an alkaline metal, alkaline earth metal or transition metal condensed phosphate, and
  (b) a vanadium compound which generates vanadate ions in the presence of water and oxygen, selected from the group consisting of vanadium (V) oxide, a vanadyl compound, an alkaline metal, alkaline earth metal or transition metal vanadate, a calcined condensate of alkaline metal, alkaline earth metal or transition metal vanadates, or a heterocondensate of alkaline earth metal or transition metal vanadates, and
(2) a film forming resin selected from the group consisting of maleic acid modified oils, epoxy resins, modified epoxy resins, alkyd resins, acryl resins, melamine resins, urea resins, blocked isocyanate resins, maleic acid modified polybutadiene resins, polyvinyl butylal, polyvinylalcohol, silicate esters, silicone resins, silicates and chlorinated rubber; said pigment being present in an amount of 0.1 to 50 parts by weight based on 100 parts by weight of a solid content of the coating composition.

DETAILED DESCRIPTION OF THE INVENTION

It is required for the corrosion preventive coating composition of the present invention to generate both phosphate ions and vanadate ions when contacted with a condition containing water and oxygen. It, however, is not necessary that these ions are contained in the coating composition as component ions. Accordingly, if these ions are possible to be present in the ion form, the coating composition may positively contain these ions. If such ions are impossible to be present in the coating composition in the ion form, the coating composition contains a compound producing these ions when contacted with water and oxygen. Although the phosphate ions are changed to many forms, for example a condensate of the phosphate ions, in an aqueous solution, the term "phosphate ions" herein is construed as including such changed forms. Also, the term "vanadate ions" herein is construed as including condensed vanadate ions. The corrosion preventive pigment of the present invention can be prepared by mixing or calcining a phosphorus compound, a vanadium compound, optionally a network modifier, and a glassy material.

The phosphorus compound is selected from the group consisting of phosphorous pentoxide, orthophosphoric acid, a condensed phosphoric acid, an alkaline metal, alkaline earth metal or transition metal phosphate, or an alkaline metal, alkaline earth metal or transition metal condensed phosphate. Orthophosphoric acid (orthophosphate) herein includes monohydrogen salt ($HPO_4^{2-}$) and dihydrogen salt ($H_2PO_4^{-}$). The condensed phosphate also includes such hydrogen phosphate salts thereof. The condensed phosphate further includes metaphosphoric acid (metaphosphate), polyphosphoric acid (polyphosphate) and polymetaphosphoric acid (polymetaphosphate). Typical examples of the phosphorus compounds are a phosphate mineral, such as monetite, whitlockite, zenotime, stercorite, struvite, vivianit and the like; a conventional complex phosphate pigment, such as poly-silicophosphate and the like; a condensed phosphoric acid, such as pyrophosphoric acid, metaphosphoric acid; a condensed phosphate, such as metaphosphate, tetrametaphosphate, hexametaphosphate, pyrophosphate, acidic pyrophosphate, tripolyphosphate and the like; and a mixture thereof. The alkaline earth metal included magnesium and calcium, and the transition metal may be manganese, cobalt, iron, nickel and the like. Preferred is the alkaline earth metal.

In addition to the above mentioned phosphoric acid and phosphates, a sludge formed from a zinc phosphate treatment of an iron substrate, which mainly contains zinc iron phosphate, can be used for the present invention, if contaminants such as crude particles, electrolyte including a chloride ion are removed from it by means of sieving or rinsing and the like.

The vanadium compound of the present invention is a compound of which vanadium valency is 4 and 5. The vanadium compound can be selected from the group consisting of vanadium (V) oxide, a vanadyl compound, an alkaline metal, alkaline earth metal or transition metal vanadate, a baked condensate of alkaline metal, alkaline earth metal or transition metal vanadates, or a heterocondensate of alkaline metal, alkaline earth metal or transition metal vanadates. The alkaline earth metal and transition metal are the same as listed in the phosphates. The vanadium compound may be prepared by heating vanadium oxide with oxides, hydroxides, carbonates, etc. of another metal at more than 600° C.

The network modifier is a metal ion source which is added for modifying a network structure of the calcined product of the phosphorus compound and the vanadium compound. Examples of the metal ions for the network modifiers are alkali metal ions, alkaline earth metal ions, typical metal ions and transition metal ions. Preferred are those listed in the phosphate compound. The network modifier is generally provided in the form of oxides, hydroxides, carbonates, nitrates, organic acid salts, silicates, borates, sulfates, chlorides and the like. Preferred are oxides, hydroxides and carbonates. If alkali metal is adopted, or if sulfates or chlorides are adopted, these compounds adversely affects on coating properties because of high water-solubility. In such a case, the matrix material including a glassy material or coating of particles effectively prevents water-solubility.

The glassy material includes not only matrix-forming glass such as silicate glass and borate glass, but also glass containing a metal element, such as a metal element of the network modifier, in matrix-forming glass. Examples of the glassy materials are silica glass; silicate glass, such as sodalime-silicate glass ($Na_2O$—$CaO$—$SiO_2$ type), lead-silicate glass ($Na_2O$—$PbO$—$SiO_2$ type), aluminosilicate glass ($Al_2O_3$—$CaO$—$SiO_2$ type), borosilicate glass ($Na_2O$—$B_2O_3$—$SiO_2$ type); lead-borosilicate glass ($PbO$—$B_2O_3$ type, so called solder glass); aluminoborophosphate glass ($BaO$—$Al_2O_3$—$B_2O_3$ type); aluminophosphate glass ($P_2O_5$—$Al_2O_3$—$ZnO$ type); and the like. Preferred is sodalime glass (C glass), such as glass flake (CCF-150; commercially available from Nippon Glass Fiber Co., Ltd.); aluminosilicate glass (E glass), such as glass flake (CEF-150; commercially available from Nippon Glass Fiber Co., Ltd.); and borosilicate glass, such as pyrex available from Corning Glass Works Co., Ltd.). An electric conductivity of the glassy material is preferably not more than 500 $\mu S/cm$ when one gram of glassy material particles is dispersed or suspended in 100 ml of water. Amounts more than 500 $\mu S/cm$ deteriorate corrosion resistance.

The pigment used for the present invention is prepared by calcining a mixture of the phosphorus compound, the vanadium compound, optionally the network modifier and the glassy material, and cooling and grinding. The other inorganic materials, such as a matrix excepting the glassy material can be formulated in the mixture. Calcining is carried out at a temperature of more than a melting point ($T_1$) of the calcined product of the mixture, preferably more than 600° C., more preferably more than 1,000° C., most preferably more than a higher melting point of either $T_1$ or the glassy material. Temperatures less than that of mentioned above become insufficient for reaction. The amounts of the phosphorus compound and the vanadium compound is within the range of 0.3 to 100, preferably 1 to 10 in terms of a molar ratio of $P_2O_5/V_2O_5$. The amount of the network modifier is from 1.3 to 3.0 times, preferably 1.3 to 2.0 times of a total molar number of $V_2O_5$ and $P_2O_5$ in case where all cations in the pigment are expressed in the form of MO, $M_2O_3$, $M_3O_4$, $MO_2$ or $M_2O$ according to their oxidation numbers. The form of the oxide is $M_2O$ when an oxidation number is one, MO when an oxidation number is 2, $M_2O_3$ when an oxidation number is 3, $M_3O_4$ when an oxidation number is 2 and 3 (for example, Mn is liable to have an oxidation number of both 2 and 3 when melted) and $MO_2$ when an oxidation number is 4. In case where the manganese oxides ($MnO_2$) are added to the mixture in order to avoid reducing an oxidation number of a vanadium element, the manganese oxides are used in an amount of not less than 0.1 mole based on one mole of $V_2O_5$. Amounts less than 0.1 mole are not sufficient to avoid reducing the oxidation number of the vanadium element. When the manganese oxide is employed, a temperature is set within the range of 700° to 1400° C. Temperatures less than 700° C. do not produce oxygen from the manganese oxides, and temperatures more than 1400° C. reduce the oxidation number of vanadium. The glassy material is present in an amount of 5 to 500 times, preferably 10 to 100 times of a total amount of the phosphorus compound, the vanadium compound, and the network modifier. Amounts outside of the above mentioned range do not provide sufficient corrosion resistance.

Although the corrosion preventive pigment can be obtained by calcining, the pigment may also be obtained by mixing optionally under pressure.

The corrosion preventive pigment of the present invention has a pH value of 5 to 9. The pH value is determined using a pH meter by dipping one gram of the pigment in 100 ml of water. Outside pH values are poor in general corrosion, such as rust and the like. The pigment preferably has an electric conductivity of 100–3,000 $\mu S/cm$, more preferably 200–1,500 $\mu S/cm$. If an electric conductivity is outside of the range, paint blister is poor.

The film-forming resin to be formulated in the corrosion preventive coating composition is selected from the group consisting of maleic acid modified oils, epoxy resins, modified epoxy resins, alkyd resins, acryl resins, melamine resins, urea resins, blocked isocyanate resins, maleic acid modified polybutadiene resins, polyvinyl butylal, polyvinylalcohol, silicid esters, silicone resins, silicates, chrolinated rubber and the like.

The corrosion preventive coating composition can be used in any forms. It, therefore, can be in the form of a water-borne coating composition, a solvent based coating composition, a powder coating composition, an electrocoating composition, a spray coating composition, a clear coating composition and the like. The corrosion preventive coating composition may also be in the form of a water-borne coating composition containing aluminum pigment and a zinc rich coating composition. The corrosion preventive properties of the present coating composition is effective not only on a substrate to be coated, but also on metal particles, such as a metallic pigment. Accordingly, the corrosion of the metallic pigment, especially aluminum pigment, is effectively prevented to impart enhanced brightness. In case of the zinc rich coating composition, the phosphate ions and vanadate ions are believed to react with zinc particles and a substrate to improve adhesive properties between the top coating and the zinc-rich coating. Although it has some possibility to form white rust on the surface of the coating of the zinc rich coating composition, the coating composition of the present invention properly inhibits the activity of the zinc particle to improve white rust. It is also found that the coating composition of the present invention improves throwing-power if it is used for electrocoating.

The coating composition may contain an extender, a color pigment, a vehicle, a solvent and another additive. Examples of the additives for paints are a plasticizer, a surfactant, a drier, a crosslinking agent, a dispersant, a thickner and an anti-sagging agent. An amount of the corrosion preventive pigment is within the range of 0.1 to 50 parts by weight, preferably 0.5 to 20 parts by weight based on the solid content of the coating composition.

The metal substrate for the pigment of the present invention includes steel, high tensile strength steel, plated steel, stainless steel, iron, aluminum and the like.

The pigment of the present invention effectively prevents or inhibits corrosion occurred in a condition wherein water and oxygen are present when the pH of the pigment is from 5 to 9. Such a corrosive condition may contain ions which is believed to accelerate corrosion, such as chloride ions. The coating composition of the present invention effectively inhibits a decline of coatings.

The coating composition of the present invention has corrosion preventive properties equal or superior to chromate ions. The present invention provides a corrosion preventive coating composition having no environmental pollution. The corrosion to be inhibited by the coating composition of the present invention includes weight loss by corrosion, corrosion cracking, hydrogen embrittlement, filiform corrosion, pitting corrosion, edge creep, fabrication portion (bend portion) corrosion.

EXAMPLES

The present invention is illustrated by the following examples which, however, are not to be construed as limiting the invention to their details

REFERENCE EXAMPLE 1

A corrosion preventive agent was prepared by mixing the components shown in Table 1.

TABLE 1

| Number | Phosphorus compound (Parts by weight) | Vanadium compound (Parts by weight) | Network modifier | pH |
|---|---|---|---|---|
| 1-a | $MgHPO_4$ (5) | $Mn_2O_3 \cdot V_2O_5$ melt (5) | | 7.4 |
| 1-b | $MgHPO_4$ (7) | $3ZnO \cdot V_2O_5$ melt (3) | | 6.8 |
| 1-c | $CaHPO_4 \cdot 2H_2O$ (5) | $Mn_2O_3 \cdot V_2O_5$ melt (5) | | 7.1 |
| 1-d | $CaHPO_4$ (1) | *1 | | 7.8 |
| 1-e | $MgHPO_4 \cdot 3H_2O$ (10) | $3MnO_2 \cdot V_2O_5$ melt (1) | | 7.5 |
| 1-f | $MgHPO_4 \cdot 3H_2O$ (10) | $V_2O_5$ (1) | | 6.6 |
| 1-g | $MgHPO_4$ (87) | $V_2O_5$ (1) | MgO (1) | 7.7 |
| 1-h | $MgHPO_4$ (10) | $V_2O_5$ (1) | MgO (0.9) | 6.8 |
| 1-i | $MgHPO_4$ (75) | $V_2O_5$ (1) | $Ca(OH)_2$ (1.6) | 6.3 |
| 1-j | $CaHPO_4 \cdot 2H_2O$ (10) | $V_2O_5$ (1) | $Ca(OH)_2$ (0.4) | 6.4 |
| 1-k | $Mg_3(PO_4)$ (10) | $V_2O_5$ (1) | | 7.9 |
| 1-l | $CaHPO_4$ (1) | $MnO_2 \cdot V_2O_5$ melt (1) | | 6.4 |

*1 $V_2O_5$, $Ca(H_2PO_4) \cdot H_2O$ and $Ca(OH)_2$ were mixed with a molar ratio (0.7:0/5:1.4). Then, one part by weight of the mixture was mixed using a mortar with one part by weight of $CaHPO_4$. The obtained mixture was dried for one hour and ground by a mortar for one hour.

REFERENCE EXAMPLE 2

The components shown in Table 2 was calcined in the condition shown in Table 2 and ground to obtain a corrosion preventive agent.

TABLE 2

| Number | Phosphorus compound | Vanadium compound | Molar ratio $P_2O_5/V_2O_5$ | Calcining Temp. (°C.) | Calcining period (hour) | Cooling rate (°C./min) | pH |
|---|---|---|---|---|---|---|---|
| 2-a | $MgHPO_4$ | $V_2O_5$ | 2/1 | 1100 | 2 | 300 | 6.0 |
| 2-b | $Mg_3(PO_4)_2$ | $CaO \cdot V_2O_5$ melt | 1/1 | 1400 | 2 | 500 | 6.1 |
| 2-c | $Zn_3(PO_4)_2$ treated sludge | $3CaO \cdot V_2O_5$ melt | 1/1 | 1400 | 2 | 600 | 6.9 |
| 2-d | $Ca(PO_3)_2$ | $4MgO \cdot V_2O_5$ melt | 1/1 | 1200 | 1 | 200 | 8.4 |
| 2-e | $P_2O_5$ | $4MnO \cdot V_2O_5$ melt | 1/1 | 1200 | 2 | 300 | 7.3 |
| 2-f | $Zn_3(PO_3)_2$ $2H_3PO_4$ | $4MgO \cdot V_2O_5$ melt | 2/1 | 1100 | 2 | 600 | 6.5 |
| 2-A | $H_3PO_4$ | $3CaO \cdot V_2O_5$ melt | 5/1 | 600 | 1 | 100 | 2.9 |
| 2-B | Metaphosphoric acid | $CaO \cdot V_2O_5$ melt | 1/1 | 800 | 1 | 100 | 2.9 |
| 2-C | Pyrophosphoric acid | $MgO \cdot V_2O_5$ melt | 1/1 | 800 | 1 | 100 | 2.9 |
| 2-D | $CaHPO_4$ | $V_2O_5$ | 1/1 | 1100 | 2 | 300 | 2.9 |
| 2-E | $Ca(PO_3)_2$ | $CaO \cdot V_2O_5$ melt | 50/1 | 1100 | 2 | 300 | 3.5 |
| 2-F | $MgHPO_4$ | $6MgP \cdot V_2O_5$ | 2/1 | 1100 | 2 | 300 | 9.8 |

REFERENCE EXAMPLE 3

The components shown in Table 3 was calcined in the condition shown in Table 3 and ground to obtain a corrosion preventive agent.

TABLE 3

| Number | Phosphorus compound | Vanadium compound | Network modifier | Molar ratio $P_2O_5/V_2O_5/MO^*$ | Calcining Temp. (°C.) | Calcining period (hour) | Cooling rate (°C./min) | pH |
|---|---|---|---|---|---|---|---|---|
| 3-a | $Ca(H_2PO_4)_2$ | $V_2O_5$ | $3CaO \cdot B_2O_3$ melt | 2/1/6 | 1100 | 1 | 300 | 7.8 |

TABLE 3-continued

| Number | Phosphorus compound | Vanadium compound | Network modifier | Molar ratio $P_2O_5/V_2O_5/MO$* | Calcining Temp. (°C.) | Calcining period (hour) | Cooling rate (°C./min) | pH |
| --- | --- | --- | --- | --- | --- | --- | --- | --- |
| 3-b | $MgHPO_4$ | $V_2O_5$ | CaO | 2.5/1/7 | 1100 | 1 | 300 | 7.2 |
| 3-c | $Mg_3(PO_4)_2$ | $V_2O_5$ | CaO | 3/1/10 | 1400 | 3 | 600 | 7.1 |
| 3-d | $P_2O_5$ | A mixture of $V_2O_5$ and $V_2O_3$ (1:1 molar ratio) | CaO | 1/1/4 | 650 | 1 | 300 | 6.6 |
| 3-e | $P_2O_5$ | $CoO.V_2O_5$ melt | $Ca(OH)_2$ | 2/1/6 | 1100 | 1 | 500 | 7.5 |
| 3-A | Metaphosphoric acid | $V_2O_5.V_2O_3$ melt | CaO | 1/1/1 | 800 | 2 | 100 | 2.8 |
| 3-B | $P_2O_5$ | $V_2O_5$ | MgO | 1/1/7 | 900 | 1 | 200 | 9.8 |

*MO can be MO, $M_2O$, or $M_2O_3$.

REFERENCE EXAMPLE 4

The components shown in Table 4 was melted at 1400° C. in the condition shown in Table 4 and ground to obtain a corrosion preventive agent.

TABLE 4

| Number | Phosphorus compound | Vanadium compound | Network modifier | Molar ratio $P_2O_5/V_2O_5/M_2O$ | Glassy material | Weight ratio* (times) | pH |
| --- | --- | --- | --- | --- | --- | --- | --- |
| 4-a | Metaphosphoric acid | $V_2O_5$ | LiOH | 2/1/4.5 | Pyrex | 50 | 6.8 |
| 4-b | Metaphosphoric acid | $V_2O_5$ | LiOH | 2/1/4.5 | C glass | 50 | 7.5 |
| 4-c | Metaphosphoric acid | $V_2O_5$ | LiOH | 2/1/4.5 | E glass | 50 | 7.8 |
| 4-d | Metaphosphoric acid | $V_2O_5$ | LiOH | 2/1/4.5 | Pyrex | 10 | 7.5 |
| 4-A | (85%)$H_3PO_4.HPO_3$ | $NaVO_3$ | $NaCO_3$ | 1/1/1 | E glass | 10 | 4.5 |
| 4-B | $P_2O_5$ | $V_2O_5$ | LiOH | 1/1/7 | Pyrex | 10 | 9.3 |

*Weight ratio of the glassy material based on phosphorus compound + vanadium compound + metwork modifier.

EXAMPLE 1 TO 4 AND COMPARATIVE EXAMPLE 1 TO 4

The example shows the corrosion preventive properties of a coating composition in which the corrosion preventive agent of Reference Example 1 is formulated.

The corrosion preventive agent was added to an aqueous emulsion paint (Nippe Wide from Nippon Paint Co. Ltd.), a melamine alkyd type paint as a thermosetting resin, and an epoxy type paint as a naturally drying resin to form a paint. The paint was applied to a steel panel and naturally dried for 10 days or cured at 140° C. for 30 minutes. The dried film had a thickness of 50 micrometer. The obtained panel was subjected to a salt spray test according to JIS Z 2371 to evaluate creepage and blister. For comparison, a paint not containing either the phosphate ion source or the vanadate ion source was prepared and tested as mentioned above. The result is shown in Table 5.

TABLE 5

| Example | Resin type | Corrosion preventive agent | Salt spray test Creepage | Blister (500 h) |
| --- | --- | --- | --- | --- |
| 1 | Emulsion | 1-a | Excellent | Good |
| 2 | Malamine alkyd | 1-b | Excellent | Good |
| 3 | Epoxy | 1-c | Good | Good |
| 4 | Epoxy | 1-d | Excellent | Excellent |
| Standard | Melamine alkyd | — | Normal | Normal |
| Comparative Example | | | | |
| 1 | Epoxy | Magnesium monohydrogenphosphate | Normal | Normal |
| 2 | Melamine alkyd | Magnesium monohydrogenphosphate | Normal | Normal |
| 3 | Melamine alkyd | $2CaO.V_2O_5$ melt | Normal | Normal |
| 4 | Emulsion | $2CaO.V_2O_5$ melt | Bad | Bad |

TABLE 5-continued

| Example | Resin type | Corrosion preventive agent | Salt spray test Creepage | Blister (500 h) |
| --- | --- | --- | --- | --- |

Creepage of Salt Spray Test

One side creepage from a cut portion

Evaluation is represented as a ratio by assigning 1 to a paint (blank) containing an extender and comparing it.

| Bad | 1.2 < Ratio |
| --- | --- |
| Normal | 0.7 < Ratio < 1.2 |
| Good | 0.2 < Ratio < 0.7 |
| Excellent | Ratio < 0.2 |

Blister was visually evaluated by using the coated panel in a salt spray testing machine (500 hours) as follows;

Good—substantially no blisters
Normal—a small number of blisters
Bad—many blisters

EXAMPLE 5 TO 13 AND COMPARATIVE EXAMPLE 5 AND 6

Five parts by weight of a corrosion preventive agent of Reference Example 2 was added to a naturally drying epoxy resin paint (Copon Mastic Primer available from Nippon Paint Co. Ltd.) in an amount shown in Table 6. The obtained paint was applied to a steel panel having been sanded by spraying and dried for 10 days to obtain a film having 100 micrometer. The obtained panel was subjected to a corrosion weight loss test and a salt spray test.

Excellent—very good in comparison a comparative sample 6.
Good—superior to the comparative sample.
Normal—equal to the comparative sample.
Bad—inferior to the comparative sample.

TABLE 6

| Examples | Pigment | Corrosion weight loss | Salt spray test Creepage | Blister |
|---|---|---|---|---|
| 5 | 2-a | Good | Good | Good |
| 6 | 2-b | Good | Good | Excellent |
| 7 | 2-c | Good | Excellent | Good |
| 8 | 2-d | Good | Excellent | Good |
| 9 | 2-e | Good | Excellent | Excellent |
| 10 | 2-f | Good | Good | Good |
| 11 | 1-a | Good | Excellent | Excellent |
| 12 | 1-e | Good | Excellent | Excellent |
| 13 | 1-h | Good | Good | Good |
| Comparative Example | | | | |
| 5 | Nothing | Bad | Bad | Normal |
| 6 | Strontium chromate | Normal | Normal | Normal |
| 7 | 2-E | Bad | Bad | Bad |
| 8 | 2-F | Normal | Bad | Bad |

EXAMPLES 14 TO 18 AND COMPARATIVE EXAMPLES 9 TO 12

A paint was prepared by mixing the following ingredients by a sand mill:

| Ingredients | Parts by weight |
|---|---|
| Coal tar pitch varnish | 30 |
| Polyol resin varnish | 12 |
| Extender pigment | 20 |
| The corrosion preventive agent of Reference Example 3 | 2 |
| Sag-resistance agent | 0.5 |
| Methyl isobutyl ketone | 5 |
| A reaction product of toluidine diisocyanate and polyol (Colonate 55 from Nippon Polyurethane Co. Ltd.) | 10 |

The resultant paint was spray coated on a dull steel panel (JIS G 3141 SPCC SD) and dried for 10 days at ambient temperature to form a film having 200 micrometer. The coated panel was subjected to a salt spray test according to JIS Z 2371 and evaluation was made as in Example 1. The result is shown in Table 7.

TABLE 7

| Example | Corrosion preventive agent | Salt spray |
|---|---|---|
| 14 | 3-a | Good |
| 15 | 3-b | Excellent |
| 16 | 3-c | Good |
| 17 | 3-d | Good |
| 18 | 3-e | Good |
| Comparative Example | | |
| 9 | — | Bad |
| 10 | Strontium chromate | Normal |
| 11 | 3-A | Bad |
| 12 | 3-B | Bad |

EXAMPLES 19 TO 22 AND COMPARATIVE EXAMPLES 13 TO 15

The present example shows a filiform corrosion test.

Five parts by weight of a corrosion preventive agent of Reference Example 4 was formulated to a melamine alkyl resin paint and coated on a cold roll steel panel to cure at 140° C. for 30 minutes.

A salt spray test was conducted for 24 hours and allowed to stand for 145 hours at a relative humidity of 85% at 35° C. and an average length of filiform corrosions was compared with a sample paint containing strontium chromate. In the evaluation, excellent is one more superior to the sample, good is one superior to the sample, normal is one equal to the sample and bad is one inferior to the sample. The result was shown in Table 8.

TABLE 8

| Example | Corrosion preventive agent | Salt spray | Filiform |
|---|---|---|---|
| 19 | 4-a | Good | Good |
| 20 | 4-a | Good | Good |
| 21 | 4-c | Good | Good |
| 22 | 4-d | Excellent | Excellent |
| Comparative Example | | | |
| 13 | — | Bad | Normal |
| 14 | 4-A | Bad | Normal |
| 15 | 4-B | Normal | Bad |

EXAMPLES 23 TO 32 AND COMPARATIVE EXAMPLE 16

The present example shows that an anionic electrocoating composition was employed.

| Ingredients | Parts by weight |
|---|---|
| Nisseki polybutadien B-1500[1] | 1000 |
| Antigen 6C[2] | 10 |
| Maleic anhydride | 250 |
| Deionized water | 20 |
| Diethylamine | 0.5 |
| Propylene glycol | 100 |
| Ethyl celosolve | 340 |

[1] Mn 1500, vinyl 65%, trans 14%, cis 16%; commercially available from Nippon Petrorium Company.
[2] N-methyl-N'-(1,3-dimethylbutyl)-p-phenylenediamine, available from Sumitomo Chemical Industries Inc.

A two liter flask having a condenser was charged with 1000 parts by weight of Nisseki polybutadiene B-1500, 10 parts by weight of Antigen and 25 parts by weight of maleic anhydride and reacted at 190° to 200° C. under mixing. After 5 hours, a termination of the reaction was confirmed by a dimethylaniline coloring reaction. After cooling to 100° C., a mixture of 20 parts by weight of deionized water and 0.5 parts by weight of diethylamine was added dropwise for about 30 minutes. After finishing the addition, mixing was continued for about one hour to obtain an acid value of 140. Then, 100 parts by weight of propylene glycol was added and reacted at 110° C. for 3 hours to obtain an acid value of 125. After adding 340 parts by weight of ethyl celosolve, a reaction was continued for about one hour to obtain a resin having a solid content of 80%.

Preparation of a Pigment Paste

A mixture was prepared by mixing 125 g of maleic acid modified polybutadiene obtained above with 13 g of triethylamine and 250 g of deionized water was slowly added to form a varnish of non-volatile of about 26%. The corrosion preventive agent and the other pigment was added to the varnish and mixed for about one hour by a disper. The resultant mixture was ground and 112 g of deionized water was added to obtain a pigment paste.

Preparation of an Electrocoating Composition

| Ingredients | Parts by weight (g) |
| --- | --- |
| Maleic acid modified polybutadien resin | 125 |
| Triethylamine | 14 |
| Newcall 710 F[3] | 1 |
| Cobalt naphthenate | 1.5 |
| Deionized water | 358.5 |
| Pigment paste obtained above | 100 |

[3]Nonionic surfactant of Nippon Surfactant Company.

The components mentioned above excepting the pigment paste were emulsified and the pigment paste was added to form an anionic electrocoating composition.

The obtained electrocoating composition was electrocoated onto two cold rolled steel panels (JIS G 3141 SPCC-SD) available from Nippon Test Panel Company, which were apart 1 cm from each other. The coating condition was set at 28°±0.5° C. and a voltage sufficient to form 30 to 35 micrometer film on a zinc phosphate treated steel panel (the steel panel treated with Granodine SD-5000 available from Nippon Paint Co. Ltd.). The coated panel was cured at 170° C. for 25 minutes and the film thickness was measured at inside and outside of the panel. The result is shown in Table 9. As is apparent from Table 9, the coating composition had enhanced throwing power.

TABLE 9

| Example | Corrosion preventive agent | Thickness of film μm | |
| --- | --- | --- | --- |
| | | Outside | Inside |
| 23 | 1-e | 26 | 18 |
| 24 | 1-f | 27 | 15 |
| 25 | 1-g | 33 | 30 |
| 26 | 1-h | 34 | 32 |
| 27 | 1-i | 31 | 26 |
| 28 | 1-j | 20 | 14 |
| 29 | 1-k | 28 | 24 |
| 30 | 1-l | 30 | 20 |
| 31 | 2-f | 30 | 16 |
| 32 | 4-a | 34 | 33 |
| Comparative Example 16 | Strontium chromate | 35 | 35 |

EXAMPLES 33 TO 36 AND COMPARATIVE EXAMPLE 17

The corrosion preventive agent of Reference Example was formulated into an aqueous paint containing an aluminum flake pigment having a length of about 25 micrometer and a thickness of about 0.8 micrometer in an amount of 0.5 parts by weight to form a paint. The obtained paint was allowed to stand at 50° C. and hydrogen gas generating from the paint was collected in a flask. An amount of gas was measured based on 50 g of the paint. The result is shown in Table 10.

The water borne paint was prepared as follow:

(Preparation of Polyester Resin)

A two liter flask equipped with a stirrer, a nitrogen-introducing tube, a temperature controlling apparatus, a condenser and a decanter was charged with 130 parts by weight of bishydroxyethyl taurine, 134 parts by weight of neopentyl glycol, 236 parts by weight of azelaic acid, 186 parts by weight of phthalic anhydride, and 27 parts by weight of xylene, and heated to start a reaction. Water produced by the reaction was azeotropically distilled together with xylene.

The mixture was heated to 190° C. over about 2 hours after commencing reflux and continued to mix and distill until an acid value corresponding to carboxylic acid was 145. The mixture was then cooled to 140° C. and 314 parts by weight of Cardura E 10 (glycidyl ester of versatic acid available from Shell Chemical Company) was added for 30 minutes while maintaining 140° C. Mixing was continued for 2 hours to terminate the reaction. The obtained polyester resin had an acid value of 59, a hydroxyl value of 90 and Mn 1054.

(Preparation of Resin Particles)

A one liter reaction vessel equipped with a stirrer, a condenser and a temperature controlling apparatus was charged with 282 parts by weight of deionized water, 10 parts by weight of the polyester resin obtained above and 0.75 parts by weight of dimethylethanolamine to form a mixture. A solution containing 4.5 parts by weight of azobiscyanovaleric acid, 45 parts by weight of deionized water and 4.3 parts by weight of dimethylethanolamine was added to the mixture, to which a solution containing 70.7 parts by weight of methyl methacrylate, 94.2 parts by weight of n-butyl acrylate, 70.7 parts by weight of styrene, 30 parts by weight of 2-hydroxyethyl acrylate and 4.5 parts by weight of ethylene glycol dimethyl acrylate was added dropwise for 60 minute. After addition, a solution containing 1.5 parts by weight of azobiscyanovaleric acid, 15 parts by weight of deionized water and 1.4 parts by weight of dimethylethanolamine was added and mixed at 80° C. for 60 minutes to obtain an emulsion having non-volatile 45%, pH 7.2, viscosity 92 cps (25° C.) and a particle size of 0.165 micron. The emulsion was spray-dried to obtain resin particles having a particle size of 0.3 micron. 100 parts by weight of the particles were dispersed in 200 parts by weight of xylene to obtain a xylene dispersion.

(Preparation of a Resin for Metallic Coating Composition)

A reaction vessel equipped with a stirrer, a temperature controlling apparatus and a condenser was charged with 76 parts by weight of ethylene glycol monobutyl ether and 61 parts by weight of a monomer solution (containing 45 parts by weight of styrene, 63 parts by weight of methyl methacrylate, 48 parts by weight 2-hydroxyethyl methacrylate, 117 parts by weight of n-butyl acrylate, 27 parts by weight of methacrylic acid, 3 parts by weight of laurylmercaptane and 3 parts by weight of azobisisobutylonitrile) at 120° C. and mixed for one hour. 28 parts by weight of dimethylethanolamine and 200 parts by weight of deionized water was added to the resultant mixture to obtain an acrylic varnish having non-volatile 50% and Mn 6,000. The resin had a OH value of 70, and an acid value of 58.

(Preparation of Metallic Coating Composition)

A mixture of 140 parts by weight of the resin varnish mentioned above, 30 parts by weight of the resin dispersion, 10 parts by weight of aluminum pigment and 30 parts by weight of Cymel 303 as a cross-linking agent was diluted with deionized water up to 25 to 30 seconds of No. 4 Ford Cup (20° C.) to form a metallic coating composition.

(Preparation of Clear Coating Composition)

A polymer was prepared as generally described in the above (Preparation of a resin for metallic coating composition), using 65.8 parts by weight of n-butyl acrylate, 11.8 parts by weight of methyl methacrylate, 16.2 parts by weight of hydroxyethyl methacrylate, 6.1 parts by weight of methacrylic acid and 5 parts by weight of azobisisobutylonitrile. The polymer was neutralized with dimethylethanolamine and then diluted with water to obtain a resin varnish having non-volatile 50%.

To the obtained resin varnish, a cross-linking agent (hexamethoxymethylolmelamine available from Mitsui Toatsu Company as "Cymel 303" was added in a solid/resin ratio of 70/30 and diluted up to 30 to 35 seconds (20° C.) of No. 4 Ford Cup to obtain a water borne clear coating composition.

(Coating Test)

The metallic coating composition was spray-applied to an intermediate coated steel panel in a thickness of 20 micron at 23° C. and 60% relative humidity, on which the clear coating composition was spray-applied in a thickness of 30 micron in a same condition mentioned above. The former was coated in two stages at an interval of one minute and then it was dried at 80° C. for 5 minutes. The latter was then coated in one stage and allowed to a setting of 7 minutes. The coated panel was cured at 150° C. for 20 minutes to obtain a sample panel.

TABLE 10

| Example | Corrosion preventive agent | Amount of hydrogen gas (cc) | Brightness |
|---|---|---|---|
| 33 | 1-a | 3 | Good |
| 34 | 1-d | 4 | Good |
| 35 | 2-d | 2 | Good |
| 36 | 3-d | 4 | Good |
| Comparative Example 17 | None | 10 | Normal |

A zinc rich paint was prepared from the following ingredients:

| Ingredients | Parts by weight |
|---|---|
| Paint charge | |
| Ethyl Silicate 28 (Colcoat Co., Ltd.) | 52.1 |
| Isopropanol | 38.9 |
| Water | 8.6 |
| 0.1 M hydrochloric acid | 0.4 |
| Pigment charge | |
| Zinc powder (CS series from Mitsui Mining & Smelting Co. Ltd.) | 70.4 |
| Corrosion preventive agent of Reference Example 1-a | 3.2 |
| Clay (ASP 200 from Engelhard Minerals & Chemicals Corp.) | 17.7 |

The paint charge excepting water and hydrochloric acid was mixed and heated to 40° C. in a reaction vessel and water and hydrochloric acid were added for one hour. After adding them, mixing was continued for another one hour to form a paint. The pigment charge was mixed with the paint to form a zinc rich paint.

The obtained zinc rich paint was spray-coated on a steel panel sand-blasted and dried for 7 days to form a film having 15±2 micrometer. The coated panel was subjected to a salt spray test and a top-coat comparative test.

(1) Salt spray test

The test was carried out for 240 hours according to JIS Z 2371. Red rust was evaluated according to ASTM (D 610). White rust was very few.

(2) Top Coat adhesive test

A paint (LZ Primer available from Nippon Paint Co. Ltd.) was coated twice and allowed to stand outside for 6 months. The obtained panel was subjected to a cross cut test and a creepage from 5 mm cut was evaluated according to JIS K 5400. Adhesive was very good.

For comparison, a zinc rich paint not containing the corrosion preventive agent was prepared and subjected to a same test. White rust and adhesive were not good.

TEST EXAMPLE 1

The coating composition is compared with that of a pigment as described in U.S. Pat. No. 4,230,500 to Bulducci.

PREPARATION OF PIGMENTS

A mixture shown in the following Table was mixed with a small amount of water to form a slurry mixture. The mixture was then heated at 700° to 800° C. for one hour and ground with a hummer mill and an automatic mortal to obtain a pigment. The pigment evaluates for corrosion preventive properties.

TABLE 1

| | | for Balducci | | | | |
|---|---|---|---|---|---|---|
| Example No. for Balducci | Phosphorus compound (mmol) | Vanadium compound (mmol) | Network modifier (mmol) | PH[1] | Corrosion weight loss[2] | Corrosive salt spray test[3] |
| Ex. 5 | BiPO$_4$ 20 g (65.8) | NH$_4$VO$_3$, 2.76 g (23.6) | MgO, 0.95 g (23.5) | 7.2 | Bad | Normal |
| Ex. 10 | | NH$_4$VO$_3$, 5.51 g (47.2) | MgO, 1.90 g (47.2) | 7.1 | Bad | No test |
| Ex. 18 | | NH$_4$VO$_3$, 4.59 g (39.3) | MgO, 2.28 g (51.1) | 8.6 | Bad | Bad |
| Ex. 16 | | NH$_4$VO$_3$, 3.67 g (31.4) | MgO, 2.66 g (66.0) | 9.9 | Bad | No test |
| Ex. 13 | | NH$_4$VO$_3$, 2.76 g (23.6) | MgO, 2.57 g (63.6) | 9.8 | Bad | No test |
| Ex. 6 700° C. | BiPO$_4$ (50) | V$_2$O$_5$ (10) | CaO (50) | 10.9 | Bad | No test |
| Ex. 7 680° C. | BiPO$_4$ (100) | V$_2$O$_5$ (10) | MgO (40) | 3.3 | Bad | No test | for the present invention

TABLE 1-continued

| Ex. No. | Phosphorus compound (mmol) | Vanadium compound (mmol) | Network modifier (mmol) | PH | Corrosion weight loss | Corrosive salt spray test |
|---|---|---|---|---|---|---|
| 1-c | CaHPO$_4$ | V$_2$O$_5$/Mn$_2$O$_3$ (*) | — | 7.1 | Good | Good |
| 1-b | MgHPO$_4$ | V$_2$O$_5$/3ZnO (*) | — | 6.8 | Good | Excellent |
| 1-h | MgHOP$_4$ 3H$_2$O | V$_2$O$_5$ | MgO | 6.8 | Good | Good |

(*) They were calcined at 1000° C. for 3 hours, then powdered by stamp mill and mortal.
[1] The pH of the powdered pigments were measured by pH-meter in the dispersion of one gram of the pigment in 100 ml of water.
[2] The powdered pigment were dispersed in a 3% NaCl solution to form a 10 g/l dispersion in which a polished steel panel (JIS 3141 G SPCC(SB)) was immersed for 10 days. The weight loss of the panel was determined and compared with strontium chromate of the same amount. In the evaluation, "good" shows superior to strontium chromate, "normal" shows equal to it and "bad" shows inferior to it.
[3] The corrosion preventive pigments were formulated to a following polyester paint.

| Paint formulation | Parts by weight |
|---|---|
| A polyester resin[1] | 33.3 |
| A melamine resin[2] | 9.3 |
| An epoxy resin[3] | 2.6 |
| TiO$_2$ | 20.8 |
| The corrosion preventive pigment | 5.2 |
| Isopropyl alcohol | 2.6 |
| Cellosolve acetate | 26.0 |
| A leveling agent[4] | 0.2 |

[1] Available from Nippon Paint Co., Ltd. as R 4304.
[2] Available from Nippon Paint Co., Ltd. as MF 009.
[3] Available from Nippon Paint Co., Ltd. as EP 0150.
[4] Available from Nippon Paint Co., Ltd. as Leveler S.

The obtained paint was coated on a steel panel (JIS 3141 G SPCC(SD)) and cured at 140° C. for 20 minutes. The cured film has 30 micrometer. The panel was subjected to a salt spray test according to JIS Z 2371. The creepage was evaluated by scribing a coated surface and taking off an adhesive tape which has been attached to the scribed portion. The evaluation was expressed by a ratio of creepage length of the paint containing the corrosion preventive pigment and a blank paint without such pigment.

| Bad | 1.2 ≦ ratio |
| Normal | 0.7 ≦ ratio < 1.2 |
| Good | 0.2 ≦ ratio < 0.7 |
| Excellent | ratio < 0.2 |

As is apparent from the above Experiment 1, the pigment of Balducci is very poor in general corrosions. We do not know why Balducci has the defect. We believe that, if BiPO$_4$ is employed, the pigment becomes difficult to generate phosphate ions.

On the other hand, the pigment of the present invention has excellent corrossion preventive properties in comparison with Balducci.

What is claimed is:

1. A corrosion preventive coating composition comprising:
   (1) a corrosion preventive pigment which has a pH value of from 5 to 9, consisting essentially of
      (a) a phosphorus compound which generates phosphate ions in the presence of water selected from the group consisting of phosphorous pentoxide, ortho-phosphoric acid, a condensed phosphoric acid, an alkaline metal, alkaline earth metal or transition metal phosphate, or an alkaline metal, alkaline earth metal or transition metal condensed phosphate, and
      (b) a vanadium compound which generates vanadate ions in the presence of water and oxygen, selected from the group consisting of vanadium (V) oxide, a vanadyl compound, an alkaline metal, an alkaline earth metal or transition metal vanadate, a calcined condensate of alkaline metal, alkaline earth metal or transition metal vanadates, or a heterocondensate of alkaline metal, alkaline earth metal or transition metal vanadates, and
   (2) a film forming resin selected from the group consisting of maleic acid modified oils, epoxy resins, modified epoxy resins, alkyd resins, acryl resins, melamine resins, urea resins, blocked isocyanate resins, maleic acid modified polybutadiene resins, polyvinyl butylal, polyvinylalcohol, silicate esters, silicone resins, silicates and chlorinated rubber; said pigment being present in an amount of 0.1 to 50 parts by weight based on 100 parts by weight of a solid content of said coating composition,
   said phosphorus and vanadium compound being present in amounts such that the molar ratio of the phosphorus to the vanadium compound in terms of P$_2$O$_5$ and V$_2$O$_5$, respectively, is 0.3 to 100 and wherein said pigment has an electric conductivity of 100 to 3,000 μS/cm.

2. The composition according to claim 1 wherein said corrosion preventive pigment is prepared by calcining a mixture of said phosphorus compound, a vanadium compound, optionally a network modifier and a glassy material and then grinding.

3. The composition according to claim 1 wherein the corrosion preventive pigment is a physical non-calcined mixture of said phosphorus compound and said vanadium compound.

4. The composition according to claim 1 being an aqueous coating composition, an anionic electrocoating composition or a zinc rich coating composition.

5. The composition according to claim 1 wherein the molar ratio of the phosphorus compound to the vanadium compound in terms of P$_2$O$_5$/V$_2$O$_5$ is 1 to 10.

* * * * *

UNITED STATES PATENT AND TRADEMARK OFFICE
CERTIFICATE OF CORRECTION

PATENT NO. : 5,064,468

DATED : November 12, 1991

INVENTOR(S) : Toshihiro OKAI et al.

It is certified that error appears in the above-identified patent and that said Letters Patent is hereby corrected as shown below:

Title page, item [73] Assignee: "[*] Notice:", change "Aug. 6, 2008" to --Dec. 5, 2006--.

Signed and Sealed this

Fifth Day of October, 1993

Attest:

BRUCE LEHMAN

*Attesting Officer*     *Commissioner of Patents and Trademarks*